United States Patent
Hayashi et al.

[11] 4,082,434
[45] Apr. 4, 1978

[54] WIDE-ANGLE OPTICAL SYSTEM FOR DOOR VIEWER

[75] Inventors: Tadaaki Hayashi; Teruto Nakahara, both of Koganei, Japan

[73] Assignee: Kabushiki Kaisha Ka-Pu, Tokyo, Japan

[21] Appl. No.: 724,137

[22] Filed: Sep. 17, 1976

[30] Foreign Application Priority Data

Sep. 20, 1975  Japan .................................. 50-113127
May 12, 1976  Japan .................................. 51-53356

[51] Int. Cl.² ............................................. G02B 7/08
[52] U.S. Cl. ................................. 350/225; 350/212
[58] Field of Search ............................. 350/212, 225

[56] References Cited

U.S. PATENT DOCUMENTS

| | | | |
|---|---|---|---|
| 2,538,077 | 1/1951 | Blosse | 350/225 |
| 3,514,188 | 5/1970 | Blosse et al. | 350/212 |

*Primary Examiner*—Conrad J. Clark
*Attorney, Agent, or Firm*—Blum, Moscovitz, Friedman & Kaplan

[57] ABSTRACT

A wide-angle optical system for a door viewer comprises a concave objective lens of a larger diameter of about 13 to 25 mm which is provided with a convex surface of a large radius of curvature of about 20 to 30 mm at the front surface thereof and with a concave surface of a small radius of curvature of about 4 to 6 mm at the central portion of the rear surface thereof, an intermediate concave lens of a smaller diameter of about 9 to 12 mm which has a concave surface of a small radius of curvature of about 4 to 7 mm provided at the front surface thereof and a convex eyepiece lens of a diameter somewhat smaller than that of the intermediate lens, said eyepiece lens having convex surfaces of a large radius of curvature of about 20 to 30 mm. The intermediate concave lens is positioned so that it contacts at the front surface thereof with the rear surface of the objective lens and so as to align the optical axis thereof with that of the objective lens. The convex eyepiece lens is positioned at a predetermined distance from the rear surface of the objective lens in such a manner that the optical axis thereof is aligned with that of the objective lens.

10 Claims, 10 Drawing Figures

WIDE-ANGLE OPTICAL SYSTEM FOR DOOR VIEWER

BACKGROUND OF THE INVENTION

This invention relates to an optical system and more particularly a wide-angle optical system for a door viewer.

Various types of optical systems used for a door viewer have been proposed. However, such conventional optical systems lack a sufficiently wide viewing angle to be certain to detect any individual on the further side of the door and are complicated in construction and expensive to manufacture as they are usually composed for four lenses or more.

SUMMARY OF THE INVENTION

In accordance with the present invention, a wide-angle optical system comprises three lenses, namely, a concave objective lens of a larger diameter, an intermediate concave lens of a smaller diameter and a convex eyepiece lens of a diameter somewhat smaller than that of the intermediate concave lens. The concave objective lens has a front convex surface of a large radius of curvature and a concave surface of a small curvature radius at the central portion of the rear surface thereof. The intermediate concave lens has a concave surface of a small radius of curvature provided at the central portion of the front surface thereof, and is positioned so that its contacts at the front surface thereof with the rear surface of the objective lens, and the optical axis thereof is aligned with that of the objective lens. The convex eyepiece lens has convex surfaces of a large radius of curvature and is positioned at a predetermined distance from the rear surface of the objective lens in such a manner that the optical axis thereof is aligned with that of the objective lens.

The optical system according to the present invention is preferably mounted in a door through a lens tube so that the front convex surface of the objective lens protrudes outwardly from the outer surface of the door.

Accordingly, an object of the present invention is to provide a wide-angle optical system for a door viewer by which exterior circumstances can be viewed with a wide viewing angle approaching 180°.

Another object of the present invention is to provide a wide-angle optical system for a door viewer of the character aforesaid which is simple in construction.

A further object of the present invention is to provide a wide-angle optical system for a door viewer of the character aforesaid which is inexpensive to manufacture and which can be mass-produced.

A further objects of the present invention is to provide a wide-angle optical system for a door viewer which is adapted to be mounted easily in a door.

Still other object and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
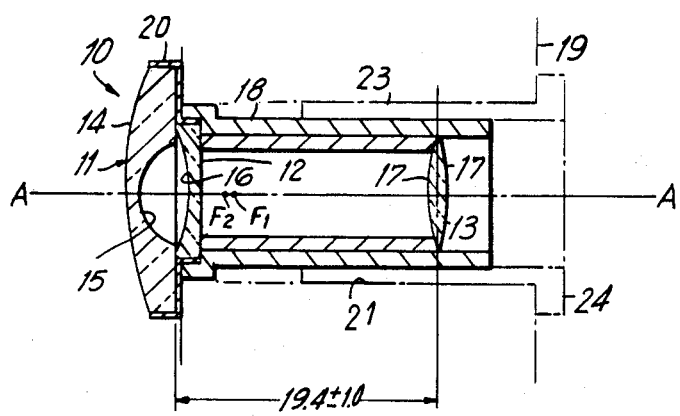
FIG. 1 is a longitudinal sectional view of a wide-angle optical system for a door viewer according to an embodiment of the present invention.

Referring now to FIGS. 1 to 4, there is shown a wide-angle optical system 10 for a door viewer according to an embodiment of the present invention. The wide-angle optical system 10, as shown in FIG. 1, comprises three lenses, namely, a concave objective lens 11 about 13 to 25 mm in diameter, an intermediate concave lens 12 of about 9 to 12 mm in diameter, and a convex eyepiece lens 13 of a diameter somewhat smaller than that of the intermediate concave lens 12, namely about 6 to 11 mm.

The concave objective lens 11 has a front convex surface 14 of a radius of curvature of about 20 to 30 mm and a rear concave surface 15 of a radius of curvature of about 4 to 6 mm at the central portion of the rear surface thereof. The intermediate concave lens 12 has a front concave surface 16 of a radius curvature of about 4 to 7 mm at the central portion of the front surface thereof. The intermediate concave lens 12 is positioned so that the concave lens 12 contact at the front surface thereof, the rear surface of the concave objective lens 11 to oppose the front concave surface 16 to the rear concave surface 15 of the objective lens 11 and so that the optical axes of lenses 11 and 12 are in alignment.

The convex eyepiece lens 13 is provided with convex surfaces 17, 17 of a radius of curvature of about 20 to 30 mm. The optical axis of eyepiece lens 13 is aligned with the optical axis AA of the lenses 11 and 12. The distance between the center of the eyepiece lens 13 and the rear surface of the objective lens 11 is determined so that the focal point $F_1$ of the lens 13 substantially coincides with the focal point $F_2$ of the lens system composed of the lens 11 and 12 on the optical axis AA. It is to be noted that where dimensions are shown in the various Figures, these represent preferred embodiments, and the present invention is not to be considered as limited to the specific embodiments shown.

Figure 2:
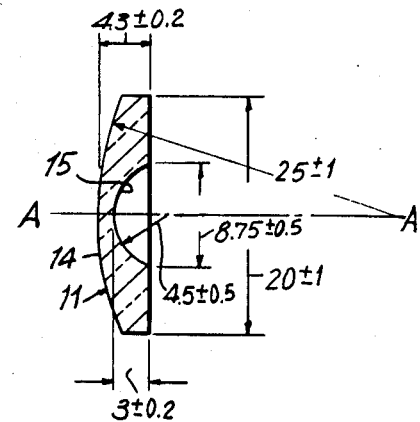
FIG. 2 is a sectional view of a concave objective lens of the optical system of FIG. 1.
Figure 3:
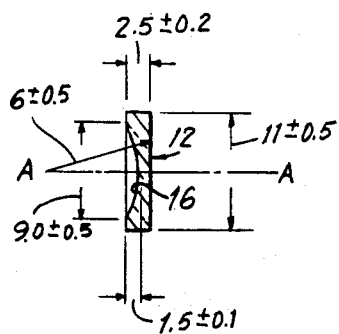
FIG. 3 is a sectional view of an intermediate concave lens of the optical system of FIG. 1.
Figure 4:
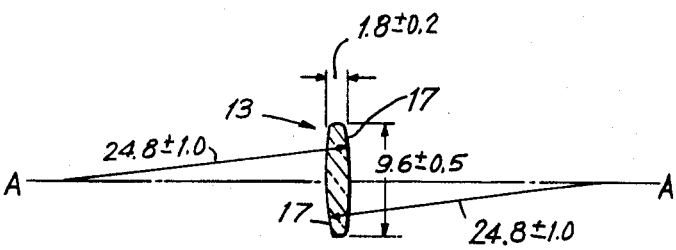
FIG. 4 is a sectional view of a convex eyepiece lens of the optical system of FIG. 1.

In the optical system 10 shown in FIG. 1, the concave objective lens 11 may be constructed in such a manner that a diameter thereof is about 20 mm, preferably 20 ± 1 mm, a thickness thereof is about 3 to 5 mm, preferably 4.3 ± 0.2 mm, the front concave surface 14 has a radius of curvature of about 25 mm, preferably 25 ± 1 mm, and the rear concave surface 15 has a diameter of about 8 to 11 mm, preferably 8.75 ± 0.5 mm, a radius of curvature of about 5 mm, preferably 4.5 ± 0.5 mm and a depth of about 2 to 4 mm, preferably 3 ± 0.2 mm, as shown in FIG. 2; the intermediate concave lens 12 has a diameter of about 11 mm, preferably 11 ± 0.5 mm, a thickness of about 1 to 3 mm, preferably 2.5 ± 0.2 mm; the front concave surface 16 has a diameter of about 6 to 10 mm, preferably 9 ± 0.5 mm, a radius of curvature of about 6 mm, preferably 6 ± 0.5 mm and a depth of about 1 to 2 mm, preferably 1.5 ± 0.1 mm, as shown in FIG. 3; and the convex eyepiece lens 13 has a diameter of about 10 mm, preferably 9.6 ± 0.5 mm, a thickness of about 1 to 2 mm, preferably 1.8 ± 0.2 mm; the convex surfaces 17, 17 have a radius of curvature of about 25 mm, preferably 24.8 ± 1.0 mm, as shown in FIG. 4. The convex lens 13 is constructed to have a focal length of about 17 mm, preferably 17.2 ± 0.2 mm. The convex lens 13 is preferably positioned so that the distance between the center of the convex lens 13 and the rear surface of the concave objective lens 11 is about 19 mm, preferably 19.4 ± 1.0 mm, as shown in FIG. 1, thus the focal point $F_1$ of the convex eyepiece lens 13 substantially coincides with the focal point $F_2$ of the lens system composed of the objective lens 11 and the intermediate lens 12 on the optical axis AA.

The optical system 10, as shown in FIG. 1, is fitted in a lens tube 18 to be mounted in a door 19 in such a manner that the optical system 10 maintains the positional relationship as determined above and the front convex surface 14 of the concave objective lens 11 protrudes outwardly from the lens tube 18. The lens tube 18 is preferably provided at one end thereof with an annular frame 20 for supporting the concave objective lens 11 therein to position the lens 11 at the outside of the door 19.

Figure 5:
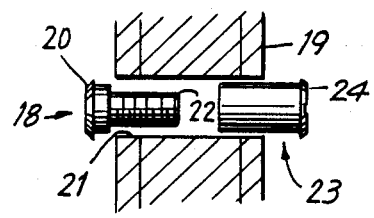
FIG. 5 is a view showing a stage in the installation of a lens tube fitted with the optical system of FIG. 1 in a door.

The lens tube 18 fitted with the optical system 10 therein is installed in the door 19 in such a manner as shown in FIG. 5. The lens tube 18 is inserted into a hole 21 bored through the door 19 from the outside of the door 19 to contact the annular frame 20 with the outer surface of the door 19. The lens tube 18 is preferably provided with a thread 22 at the outer surface thereof. Then, an outer tube 23 provided with a flange 24 at one end thereof and with an internal thread (not shown) is inserted into the hole 21 from the inside of the door 19, so that the outer tube 23 is screwed onto the lens tube 18 to press the flange 24 against the inner surface of the door 19, to thereby install the lens tube 18 in the door 19.

Figure 6:
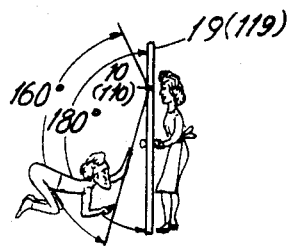
FIG. 6 is a pictorial view showing the function of the optical system installed in the door.

When locking out of the door 19 through the optical system 10 of the present invention, the surroundings exterior to the door can be viewed over a solid angle of about 180°, as shown in FIG. 6, since the concave objective lens 11 having the front convex surface 14 of a larger radius of curvature of 25 ± 1 mm and the rear concave surface 15 of a smaller radius of curvature of 4.5 ± 0.5 mm cooperates with the intermediate concave lens 12 having the front concave surface 16 of a smaller radius of of curvature of 6 ± 0.5 mm to provide a large refractive angle.

As material for the lenses of the present invention may be used conventional glass with an average refractive index such as 1.51633 ± 0.00009.

Referring to FIGS. 7 to 10, there is shown a wide-angle optical system 110 for a door viewer according to another embodiment of the present invention.

Figure 7:
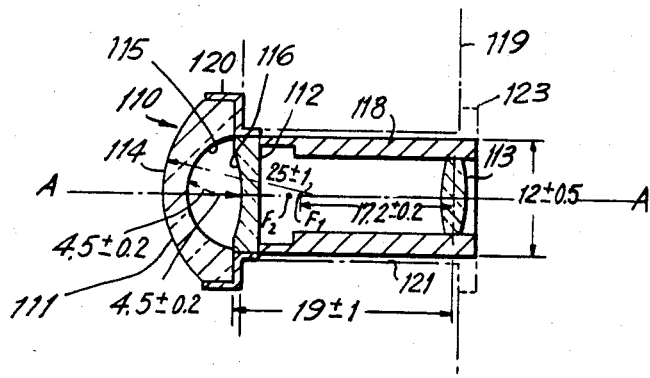
FIG. 7 is a longitudinal sectional view of a wide-angle optical system for a door viewer according to another embodiment of the present invention.

The wide-angle optical system 110, as shown in FIG. 7, is constructed in the substantially same manner as the optical system 10 shown in FIG. 1. The optical system 110 comprises a concave objective lens 111 of about 13 to 25 mm in diameter, an intermediate concave lens 112 of about 9 to 12 mm in diameter and a convex eyepiece lens 113 of about 6 to 11 mm in diameter.

Figure 8:
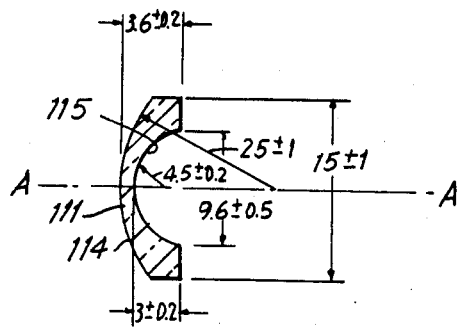
FIG. 8 is a sectional view of a concave objective lens of the optical system of FIG. 7.
Figure 9:
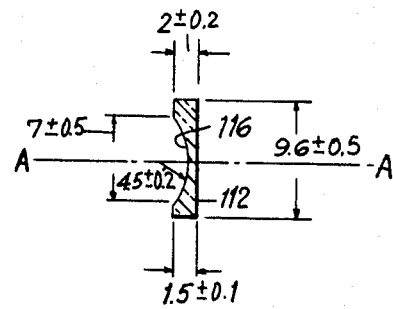
FIG. 9 is a sectional view of an intermediate concave lens of the optical system of FIG. 7.
Figure 10:
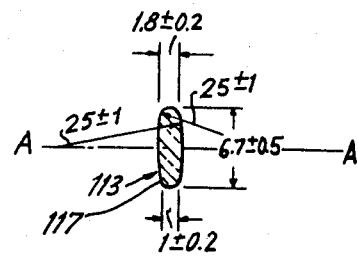
FIG. 10 is a sectional view of a convex eyepiece lens of the optical system of FIG. 7.

The concave objective lens 111, as shown in FIG. 8, may be constructed in such a manner that a diameter thereof is about 15 mm, preferably 15 ± 1 mm, a thickness thereof is about 3 to 5 mm, preferably 3.6 ± 0.2 mm, the front convex surface 114 thereof has a radius of curvature of about 20 to 30 mm, preferably 25 ± 1 mm, and the rear concave surface 115 thereof has a diameter of about 8 to 11 mm, preferably 9.6 ± 0.5 mm, a radius of curvature of about 4 to 6 mm, preferably 4.5 ± 0.2 mm, and a depth of about 2 to 4 mm, preferably 3 ± 0.2 mm; the intermediate concave lens 112, as shown in FIG. 9, may have a diameter of about 10 mm, preferably 9.6 ± 0.5 mm, and a thickness of about 1 to 3 mm, preferably 2 ± 0.2 mm; the front concave surface 116 has a diameter of about 6 to 10 mm, preferably 7.0 ± 0.5 mm, a radius of curvature of about 4 to 7 mm, preferably 4.5 ± 0.2 mm, and a depth of about 1 to 2 mm, preferably 1.5 ± 0.1 mm; and the convex eyepiece lens 113, as shown in FIG. 10, may have a diameter of about 7 mm, preferably 6.7 ± 0.5 mm, a thickness of about 1 to 2 mm, preferably 1.8 ± 0.2 mm; the convex surfaces 117, 117 have a radius of curvature of about 20 to 30 mm, preferably 25 ± 1 mm. The convex lens 113 is constructed to have a focal length of about 17 mm, preferably 17.2 ± 0.2 mm. The convex lens 113 is preferably positioned so that the distance between the center of the convex lens 113 and the rear surface of the objective lens 111 is about 19 mm, preferably 19 ± 1 mm, thus the focal point $F_1$ of the eyepiece lens 113 substantially coincides with the focal point $F_2$ of the lens system composed of the objective lens 111 and the intermediate lens 112 on the optical axis AA.

The optical system 110 is fitted in a lens tube 118 in the same manner as the optical system 10 is fitted in the lens tube 18. The lens tube 118 may have an outer diameter of about 12 mm, preferably 12 ± 0.5 mm, substantially the same as that of a lens tube utilized widely for a door viewer.

The lens tube 118 may be installed in a door 119 in the manner shown in FIGS. 5 and 7. In FIG. 7, the lens tube 118 is inserted into a hole 121 bored through the door 119 from the outside of the door 119 to contact an annular frame 120 provided at one end of the lens tube 118 with the outer surface of the door 119 and to protrude the other end thereof inwardly from the inner surface of the door 119. The protruding end is preferably provided with a thread thereon. Then, a nut 123 is screwed on the protruding end of the lens tube 118 to press the nut 123 against the inner surface of the door 119, to thereby hold the lens tube 118 in the door 119.

The optical system 110 composed of the three lenses 111, 112 and 113 arranged in such positional relationship has a wide viewing angle of 170° to 175°, as shown in FIG. 6, since the concave objective lens 111 having the front convex surface 114 of the larger radius of curvature of 25 ± 1 mm and the rear concave surface 115 of a smaller radius of curvature of 4.5 ± 0.2 mm cooperates with the intermediate concave lens 112 having the front concave surface 116 of a smaller radius of curvature of 4.5 ± 0.2 mm to provide a large refractive angle.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings, shall be interpreted as illustrated and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A wide-angle optical system for a door viewer, comprising a concave objective lens of about 13 to 25 mm in diameter and about 3 to 5 mm in thickness, said concave objective lens having a front convex surface of about 20 to 30 mm in radius of curvature and having a rear concave surface of about 2 to 4 mm in depth, about 8 to 11 mm in diameter and about 4 to 6 mm in radius of curvature provided at the central portion of the rear surface thereof;

an intermediate concave lens of about 9 to 12 mm in diameter and about 1 to 3 mm in thickness, said intermediate concave lens having a front concave surface of about 6 to 10 mm in diameter, about 1 to 2 mm in depth and about 4 to 7 mm in radius of curvature provided at the central portion of the front surface thereof; and a convex eyepiece lens of about 6 to 11 mm in diameter and about 1 to 2 mm in depth, said convex eyepiece lens having a convex surface of about 20 to 30 mm in radius of curvature provided at the both surfaces thereof; wherein said intermediate concave lens is positioned so that the front surface thereof contacts the rear surface of said concave objective lens to oppose said front concave surface of said intermediate concave lens to said rear concave surface of said concave objective lens and so as to align the optical axis of said intermediate concave lens with that of said concave objective lens, and said convex eyepiece lens is positioned to the rear of said concave objective lens in such a manner that the optical axis thereof is aligned with the optical axis of said concave lenses and the distance between the center of said convex eyepiece lens and the rear surface of said concave objective lens substantially corresponds to the sum of the focal length of said convex eyepiece lens and that of the lens system composed of said concave objective lens and said intermediate concave lens.

2. A wide-angle optical system for a door viewer as defined in claim 1, wherein said optical system is mounted in a door through a lens tube for fitting said optical system therein so that said front convex surface of said concave objective lens protrudes outwardly from the outer surface of said door.

3. A wide-angle optical system for a door viewer as defined in claim 2, wherein said lens tube is provided at one end thereof with an annular frame for supporting said concave objective lens therein to allow said front convex surface of said concave objective lens to protrude outwardly from said outer surface of said door.

4. A wide-angle optical system for a door viewer as defined in claim 1, wherein said concave objective lens is constructed in such a manner that the diameter thereof is 20 ± 1 mm, the thickness thereof is 4.3 ± 0.2 mm, said front convex surface has a radius of curvature of 25 ± 1 mm, and said rear concave surface has a diameter of 8.75 ± 0.5 mm, a radius of curvature of 4.5 ± 0.5 mm and a depth of 3 ± 0.2 mm;

said intermediate concave lens is constructed in such a manner that the diameter thereof is 11 ± 0.5 mm, the thickness thereof is 2.5 ± 0.2 mm, said front concave surface has a diameter of 9 ± 0.5 mm, a radius of curvature of 6 ± 0.5 mm and a depth of 1.5 ± 0.1 mm;

said convex eyepiece lens is constructed in such a manner that the diameter thereof is 9.6 ± 0.5 mm, the thickness thereof is 1.8 ± 0.2 mm, and said convex surfaces have a radius of curvature of 24.8 ± 1.0 mm; and said convex eyepiece lens is positioned to the rear of said concave objective lens at a distance therefrom of 19.4 ± 1.0 mm.

5. A wide-angle optical system for a door viewer as defined in claim 4, wherein said optical system is mounted in a door through a lens tube for fitting said optical system therein so that said front convex surface of said concave objective lens protrudes outwardly from the outer surface of said door.

6. A wide-angle optical system for a door viewer as defined in claim 5, wherein said lens tube is provided at one end thereof with an annular frame for supporting said concave objective lens therein to allow said front convex surface of said concave objective lens to protrude outwardly from said outer surface of said door.

7. A wide-angle optical system for a door viewer as defined in claim 1, wherein said concave objective lens is constructed in such a manner that the diameter thereof is 15 ± 1 mm, the thickness thereof is 3.6 ± 0.2 mm, said front convex surface has a radius curvature of 25 ± 1 mm, and said rear concave surface has a diameter of 9.6 ± 0.5 mm, a radius of curvature of 4.5 ± 0.2 mm and a depth of 3 ± 0.2 mm;

said intermediate concave lens is constructed in such a manner that the diameter thereof is 9.6 ± 0.5 mm, the thickness thereof is 2 ± 0.2 mm, said front concave surface has a diameter of 7.0 ± 0.5 mm, a radius of curvature of 4.5 ± 0.2 mm and a depth of 1.5 ± 0.1 mm;

said convex eyepiece lens is constructed in such a manner that the diameter thereof is 6.7 ± 0.5 mm, the thickness thereof is 8.2 ± 0.2 mm and said convex surfaces have a radius of curvature of 25 ± 1 mm; and said convex eyepiece lens is positioned to the rear of said concave objective lens at a distance therefrom of 19 ± 1 mm.

8. A wide-angled optical system for a door viewer as defined in claim 7, wherein said optical system is fitted to a lens tube to be mounted in a door in such a manner that said intermediate concave lens and said convex eyepiece lens are arranged in said lens tube, and said concave objective lens is arranged in an annular frame provided at one end of said lens tube to allow said front convex surface thereof to protrude outwardly from the outer surface of said door.

9. A wide-angle optical system for a door viewer as defined in claim 8, wherein
said lens tube has an outer diameter of 12 ± 0.5 mm.

10. A wide-angle optical system for a door viewer as defined in claim 1, wherein said lenses are of conventional glass having a refractive index of 1.51633 ± 0.00009.

* * * * *